T. DREWRY.
EXPANSION JOINT.
APPLICATION FILED JULY 31, 1918.
1,302,022.
Patented Apr. 29, 1919.
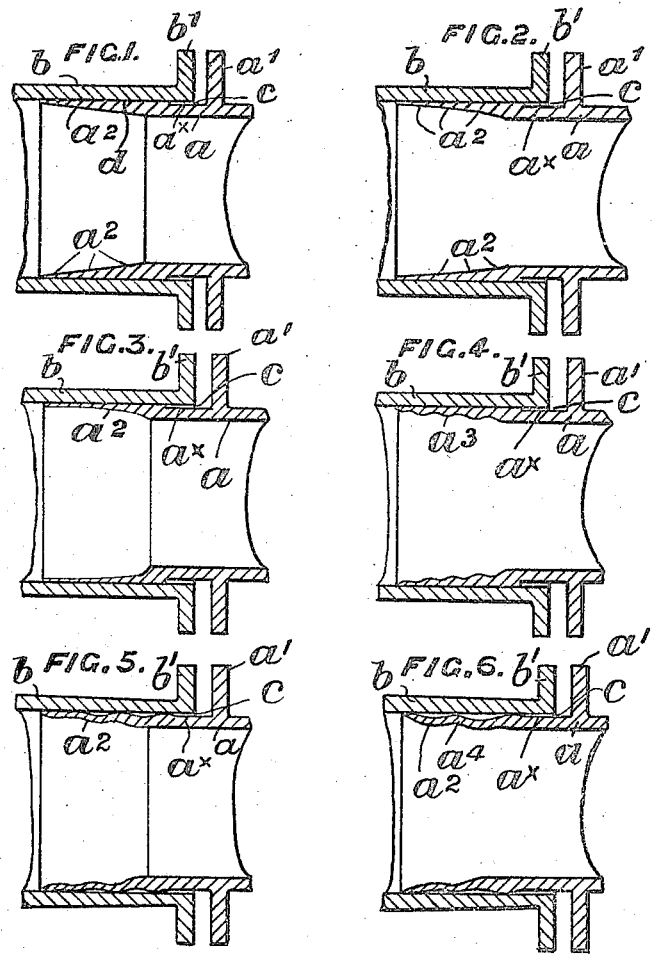

UNITED STATES PATENT OFFICE.

THOMAS DREWRY, OF FOREST GATE, ENGLAND, ASSIGNOR TO J. STONE AND COMPANY, LIMITED, OF DEPTFORD, ENGLAND.

EXPANSION-JOINT.

1,302,022.     Specification of Letters Patent.     Patented Apr. 29, 1919.

Application filed July 31, 1918. Serial No. 247,562.

*To all whom it may concern:*

Be it known that I, THOMAS DREWRY, a subject of the King of Great Britain, of 58 Claremont road, Forest Gate, in the county of Essex, England, have invented certain new and useful Improvements in and Connected with Expansion-Joints, of which the following is a specification.

This invention relates to expansion joints of the type in which telescopic sleeves are employed for effecting pipe joints, the inner sleeve being internally of a gradually increasing diameter toward the end so that, being relatively thin, it may be distended or expanded by the fluid pressure and hermetically seal the joint, while nevertheless permitting of the telescopic movement due to the expansion or contraction of the metal of which the pipes are made. Moreover the invention is equally applicable to expansion joints of the balanced type.

According to this invention, and in order to obviate distortion of, or racking strains in, the pipes, which may be due to unequal expansion, contraction and vibration, or to any of these conditions, the inner sleeve or spigot is slightly reduced in external diameter, except in the region of the internally tapered end of the spigot or inner sleeve so that, in practice, the only part of the spigot in intimate contact with the outer sleeve is that in the region of the internally tapered end of the spigot and, if desired, a short distance beyond it. The end of the spigot is, in some cases, materially reduced in diameter before being made taper or the contour of the taper in longitudinal section may be in the form of a parabolic or other suitable curve, so as to provide the desired degree of flexibility without deleteriously affecting the strength of the sleeve.

In order that the invention may be readily understood reference is made to the accompanying drawings in which:—

Figure 1 is a longitudinal section of an expansion joint constructed according to this invention and Figs. 2, 3, 4, 5 and 6 are similar views of other constructions or modifications.

In carrying the invention into effect and according to one construction illustrated in Fig. 1, the spigot or inner sleeve $a$ and the outer sleeve $b$ are furnished, as usual, with flanges $a^1$, $b^1$, for connection to the line of piping in which the expansion joint is inserted, the end portion $a^2$ of the spigot being made taper or of gradually increasing diameter. The spigot $a$ fits easily within the outer sleeve $b$ in the region of the tapered portion or a little beyond the same but the rest of the spigot or so much of it may be contained in the outer sleeve $b$ is slightly reduced in diameter, as at $a^x$, and this reduction in the case of a 2 inch pipe, for example, may be about $\frac{5}{1000}$ of an inch so as to allow of a small amount of clearance $c$ between the sleeves $a$, $b$ except at the joint $d$ over the tapered portion $a^2$. By this means, excessive friction between the sleeves $a$ and $b$ is prevented, the expansion and contraction can take place freely and the pipes are not subjected to racking strains while nevertheless a perfectly fluid tight joint is maintained at all temperatures and pressures. The taper $a^2$ may be straight or uniform as in Fig. 1, or in the form of a parabolic curve as shown in Fig. 2 or partly curved and partly straight as in Fig. 3, or in the form of internal undulations or corrugations, $a^3$ as in Fig. 4 or the tapered portion $a^2$ may be corrugated both internally and externally as in Fig. 5. Furthermore, one or more of the external corrugations may be of reduced diameter, so as not to be in contact with the bore of the outer sleeve $b$, as in the case of the corrugation $a^4$, Fig. 6.

I claim:—

1. An expansion telescopic joint for pipes comprising a tapered end portion on the inner sleeve adapted to be distended by fluid pressure into contact with the outer sleeve, and a non-distending portion on the inner sleeve having an external diameter smaller than the internal diameter of the outer sleeve substantially as set forth.

2. An expansion telescopic joint for pipes comprising an inner sleeve having a tapered end portion distensible by fluid pressure into contact with an outer sleeve and a non-distensible cylindrical portion having an external diameter smaller than the internal diameter of the outer sleeve substantially as set forth.

THOMAS DREWRY.